United States Patent [19]

Barth

[11] 3,957,143

[45] May 18, 1976

[54] PARKING BRAKE RELEASE FOR TRANSMISSION CLUTCH

[75] Inventor: John W. Barth, Topeka, Kans.

[73] Assignee: Allis-Chalmers Corporation, Milwaukee, Wis.

[22] Filed: Dec. 19, 1974

[21] Appl. No.: 534,566

[52] U.S. Cl............................ 192/4 A; 188/106 F; 303/3; 303/10
[51] Int. Cl.²....................................... B60K 41/26
[58] Field of Search............. 303/2, 3, 13, 15, 10; 188/359, 355, 152, 106 F; 192/4 A, 4 R, 4 A X, 4 C

[56] References Cited
UNITED STATES PATENTS

| | | | |
|---|---|---|---|
| 3,439,785 | 4/1969 | Hughson | 192/4 A |
| 3,565,220 | 2/1971 | Lammers et al. | 192/4 A |
| 3,582,150 | 6/1971 | Williams et al. | 303/10 X |
| 3,635,317 | 1/1972 | Crabb et al. | 192/4 A |
| 3,655,018 | 4/1972 | Higuchi et al. | 192/4 A |
| 3,710,904 | 1/1973 | Boyer et al. | 192/4 A |
| 3,850,273 | 11/1974 | Murakami | 192/4 A |
| 3,854,559 | 12/1974 | Talak et al. | 192/4 A |

Primary Examiner—Trygve M. Blix
Assistant Examiner—Douglas C. Butler
Attorney, Agent, or Firm—Arthur L. Nelson

[57] ABSTRACT

A vehicle control system including a hydraulically actuated transmission with a transmission control and a vehicle brake for braking the vehicle with a cutoff valve interconnected to the brake for interrupting power transmission through the transmission when the parking brake is actuated.

6 Claims, 2 Drawing Figures

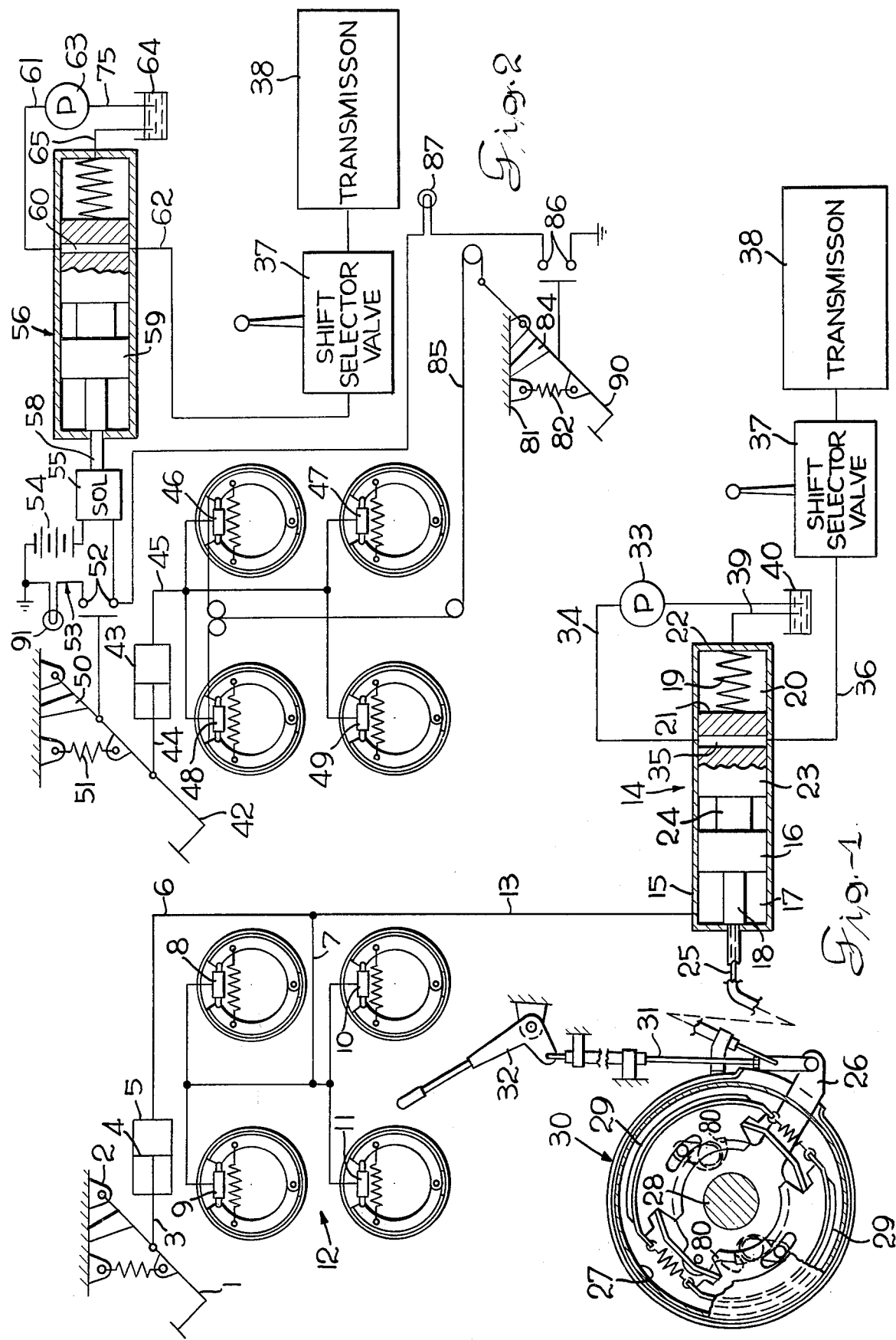

PARKING BRAKE RELEASE FOR TRANSMISSION CLUTCH

This invention relates to vehicle transmission and brakes and more particularly to a brake actuating mechanism for neutralizing the transmission of power and preventing transmission of power through the transmission when the brakes are actuated.

Power vehicles such as tractors have engines so powerful that they overpower the effect of a parking brake on the vehicle. Although the parking brake will hold the vehicle from rolling against a static load when the parking brake is on, when the vehicle transmission is operating, the engine will overpower the parking brake and generate heat very rapidly and soon cause the brake linings to become permanently damaged. Although warning lights are provided on such vehicles, they are not always heeded and the loss of the brakes will require replacement, but in the meantime create a condition where the vehicle is without brakes and present a hazard to the operator.

Accordingly, this invention provides a means whereby the brake actuating mechanism is interconnected with the transmission to place the transmission in neutral when the parking brake is set. Accordingly, when the parking brakes are used it is not possible to operate the vehicle transmission and so the parking brakes will not be burned up because of operating the vehicle while the brakes were engaged.

It is an object of this invention to provide a control system which places the transmission in neutral when the parking brake is engaged and the transmission is reengaged when the parking brake is released.

It is another object of this invention to provide a control system for actuating the parking brake and simultaneously disabling the drive through the transmission to prevent transmission of power through the transmission when the parking brakes are actuated.

It is a further object of this invention to provide a vehicle control system having a hydraulically actuated transmission with a vehicle park brake interconnected with the transmission for interrupting power transmission through said vehicle transmission when the parking brakes are actuated.

The objects of this invention are accomplished by providing a hydraulically actuated power transmission for transmitting power from the engine to the drive wheels of the vehicle. A shift selector valve is positioned between the source of pressurized fluid and the transmission. Also positioned intermediate the source of pressurized fluid and the transmission is a transmission cutoff valve which is operated by the parking brake system. The parking brake system includes a brake lever for operating vehicle brakes through a brake actuating means. The brake may be a wheel brake or a drive shaft brake. The brake actuating means is connected to the cutoff valve to interrupt communication between the source of pressurized fluid and the transmission and thereby interrupt transmission of power through the transmission while the parking brake is engaged. When the parking brake is disengaged, the interruption of communication between the source of pressurized fluid and the transmission is overcome and the power transmission again is operative.

Referring to the drawings, the preferred embodiment of this invention is illustrated.

FIG. 1 illustrates the preferred embodiment of this invention showing the parking brake having mechanical means for operating a drive shaft brake.

FIG. 2 illustrates a hydraulic vehicle brake and a mechanically operated parking brake with a warning light circuit operated by the brake levers including a solenoid operated cutoff valve.

Referring to the drawings, FIG. 1 shows a hydraulically actuated vehicle brake and a mechanically actuated parking brake in a vehicle braking system. The brake pedal 1 is pivotally supported on the bracket 2. The push rod 3 operates a piston 4 within a master cylinder 5. A master cylinder 5 pressurizes fluid in the conduits 6 and 7 which are connected to a plurality of wheel cylinders 8, 9, 10 and 11. A hydraulic brake system 12 is also connected by means of conduit 13 to the cutoff valve assembly 14.

The cutoff valve assembly includes a cylinder 15 receiving a piston 16 defining a pressurizing chamber 17. The rod 18 is connected to the piston 16 which limits the rearward movement on the piston 16 in response to the spring 19 in the spring chamber 20. Spring chamber 20 is defined by the spring seat 21 and the end wall 22 and the cylinder 15. The spool 23 is connected by the rod 24 to the piston 16. The piston is normally positioned in the left-hand position as shown.

The brake cutoff valve actuating cable 25 is connected to the rod 18 and is also connected to the brake actuating arm 26. The brake actuating arm 26 extends into the drive shaft drum brake 30 for the drive shaft 28 and mechanically expands the brake shoes 29 to engage drum 27 for operating a drive shaft drum brake 30.

A brake actuating cable 31 is connected between the brake lever 32 and the actuating arm 26. When the brake lever 32 is moved in a counterclockwise direction, the actuating arm 26 expands the brake shoes 29 against the drum 27 to operate the drive shaft brake 30.

A source of pressurized fluid 33 provides pressurized fluid in the conduit 34 connected to the cutoff valve 35. The opposite side of the cutoff valve is connected to the conduit 36 which supplies pressurized fluid to the shift selector valve 37 which in turn selectively operates one or more transmission speeds in the transmission 38. The spring chamber 20 is vented through the conduit 39 to the reservoir 40 to return any fluid leakage.

FIG. 2 illustrates a modification of a circuit illustrated in FIG. 1 in which a vehicle brake pedal 42 operates a master cylinder 43 by push rod 44. Master cylinder 43 pressurizes fluid in the conduit 45 for actuation of the wheel cylinders 46, 47, 48 and 49.

The brake pedal 42 is normally returned to the retracted position engaging the stop 50 in response to the return spring 51 as shown in FIG. 2. When the pedal 42 is in the forward position for actuation of the brakes the pedal 42 engages the switch 52 in the electrical circuit 53 including the battery 54 and service brake light 91. The switch 52 closes to energize the solenoid 55 and operate the cutoff valve 56. The solenoid is connected through the rod 58 to the spool 59 which opens and closes the passage 60 between the conduits 61 and 62. Conduit 61 is connected to the pump 63. The pump receives fluid from the reservoir 64 through conduit 75. Fluid leakage is returned to the reservoir through the return conduit 65. Normally the pump 63 pressurizes the fluid in the conduit 61 which is transmitted through the cutoff valve 56 to the conduit 62 to operate the control valve 37 for the transmission 38. Solenoid 55 when energized biases the spool 59 in the right-hand direction to interrupt communications between the conduit 61 and conduit 62 to interrupt the flow of pressurized fluid from the pump 63 to the transmission 38. The transmission clutch is disengaged and the transmission no longer transmits power to drive the vehicle.

The parking brake in FIG. 2 includes the pedal 90 pivotally mounted on the chassis 81. The pedal 90 is normally biased to a return position by the spring 82 to return the pedal against stop 84. The pedal 90 is connected to the cable 85 which actuates the brakes 46 and 48 when the brake pedal 90 is depressed. As the brake pedal 90 is depressed the switch 86 is closed to energize the warning light 87 as well as the solenoid 55. When the solenoid 55 is energized the cutoff valve 56 is closed and power transmission through the transmission 38 is interrupted.

The operation of the system as described above will be described in the following paragraphs.

When the hydraulic brake system as shown in FIG. 1 is actuated, the lever 1 rotates in a counterclockwise direction pressurizing fluid in the hydraulic master cylinder 5. Pressurized fluid in the master cylinder 5 is transmitted through the conduits 6 and 13 to the pressurizing fluid chamber 17 biasing the piston 16 and the valve spool 23 in the right-hand direction cutting off the flow of fluid between the pump 33 and the conduit 34 to the conduit 36 and the transmission selector valve 37 and interrupting power transmission through the transmission.

When the brake 30 for the drive shaft 28 is actuated, the lever 32 is rotated in the clockwise direction causing the brake actuating arm 26 to rotate in a counterclockwise direction. This causes the cams 80 to expand the brake shoes 29 against the drum 27 which actuates the drive shaft brake 30. Simultaneously the cable 25 operates to push the rod 18 and piston 16 in the right-hand direction. This, in turn, carries the spool 23 to interrupt communication between the conduits 34 and 36 and cut off the flow of pressurized fluid from the pump 33 to the transmission selector valve 37 which ocrates the transmission 38. Accordingly, no power can be transmitted through the transmission when the pressurized fluid for actuating the clutches in the transmission 38 is interrupted.

Similarly when the brake pedal 42 is rotated in a counterclockwise direction fluid is pressurized within the master cylinder 43 and conduit 45 to operate the wheel brakes 46, 47, 48 and 49. When the brake pedal 42 rotates in the extreme counterclockwise direction, it closes the switch 52 and the switch conducts electrical energy from the battery 54 to energize the solenoid 55 which in turn causes the armature 58 to move in the right-hand direction which carries the spool 59 to a position to interrupt communication between the conduits 61 and 62. Accordingly, the flow of pressurized fluid from the pump 63 is interrupted and the transmission selector valve 37 no longer receives pressurized fluid to operate the clutches in the transmission 38. The transmission 38 is preferably a power shift transmission which has hydraulic actuators for selectively engaging at least one of a plurality of clutches for transmitting power through the transmission. Reference may be had to U.S. Pat. Nos. 3,722,300 and 3,722,301, Crooks, showing power shift transmissions and U.S. Pat. No. 2,954,040, Bolster, showing a coventional drain valve for use in a hydraulically actuated clutch.

As the parking brake 90 is depressed it rotates in a counterclockwise direction. This in turn engages the brakes 46 and 48 by means of the cable 85. Actuation of the brakes 46 and 48 by the pedal 90 closes the switch 86 and energizes the solenoid 55 and disengages the transmission 38.

When the brakes are disengaged, the flow of pressurized fluid from the source of pressurized fluid through the transmission selector valve 37 is again restored and the transmission operates to transmit power from the engine to the drive wheels. In either of the illustrations shown in FIG. 1 or FIG. 2, power to the transmission is restored when the parking brake or the service brake is released.

The embodiments of the invention in which an exclusive property or privilege is claimed are defined as follows:

1. A vehicle control system comprising, a source of pressurized fluid, a hydraulically actuated vehicle transmission, a transmission shift selector valve for selectively engaging said transmission, a vehicle brake, brake operating means including, a brake lever, a brake actuating means operatively connected between said brake lever and said brake for actuating said vehicle brake, a cutoff valve between said source of pressurized fluid and said transmission, an electrical circuit connected between said brake operating means and said transmission cutoff valve including a brake switch and solenoid, said switch closing for energizing said solenoid for operating said cutoff valve to interrupt communication between said source of pressurized fluid and said transmission for rendering said transmission inoperative when said brake is actuated.

2. A vehicle control system as set forth in claim 1 wherein said vehicle brake defines a service brake, said electrical circuit includes an electrical warning system including said switch activated by said brake lever when said brake is actuated, a brake light, a solenoid in series with said brake light in said electrical warning circuit operating said cutoff valve in response to brake actuation to thereby energize said solenoid and interrupt communication between said source of pressurized fluid and said transmission.

3. A vehicle control system as set forth in claim 1 wherein said vehicle brake defines a service brake for braking said vehicle.

4. A vehicle control system as set forth in claim 1 wherein said brake defines a parking brake.

5. A vehicle control system as set forth in claim 1 wherein said brake defines a hydraulic service brake, means connecting said solenoid to said cutoff valve for thereby operating said cutoff valve to interrupt power transmission through said transmission.

6. A vehicle control system as set forth in claim 1 wherein said brake defines a parking brake, said electrical circuit including a solenoid, a solenoid armature connecting said solenoid to said cutoff valve, a brake warning light, said switch in said electrical circuit closing in response to actuation of said brake for energizing said solenoid and actuating said cutoff valve to disengage said transmission.

* * * * *